United States Patent
Yonehana

(10) Patent No.: US 12,308,774 B2
(45) Date of Patent: May 20, 2025

(54) ELECTRIC MOTOR SYSTEM

(71) Applicant: HONDA MOTOR CO., LTD., Tokyo (JP)

(72) Inventor: Atsushi Yonehana, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 18/188,591

(22) Filed: Mar. 23, 2023

(65) Prior Publication Data

US 2023/0308038 A1 Sep. 28, 2023

(30) Foreign Application Priority Data

Mar. 25, 2022 (JP) ................................. 2022-049599

(51) Int. Cl.
*H02P 25/22* (2006.01)
(52) U.S. Cl.
CPC .................................. *H02P 25/22* (2013.01)
(58) Field of Classification Search
CPC ...................................................... H02P 25/22
USPC ........................................................ 318/496
See application file for complete search history.

(56) References Cited

U.S. PATENT DOCUMENTS

| | | | | |
|---|---|---|---|---|
| 9,847,685 B2* | 12/2017 | Nakagawa | ............... | H02K 3/12 |
| 2007/0120520 A1* | 5/2007 | Miyazaki | .............. | B60L 15/025 |
| | | | | 318/801 |
| 2020/0366232 A1* | 11/2020 | Kinjo | ..................... | H02P 25/18 |

FOREIGN PATENT DOCUMENTS

JP 2007-254095 A 10/2007

OTHER PUBLICATIONS

Chen et al. (CN 107959362 B) A Fault Tolerant Control Method Of Multi-mode Double-passage Switch Reluctance Motor System ( Year: 2018).*

* cited by examiner

*Primary Examiner* — Jorge L Carrasquillo
(74) *Attorney, Agent, or Firm* — Rankin, Hill & Clark LLP

(57) ABSTRACT

In an electric motor system, a power conversion device includes, for each phase, two sets each of which includes an upper arm and a lower arm that are connected in series, the two sets being connected in parallel to a direct-current power supply. The electric motor is a star-connected electric motor. The electric motor includes two coils for each phase.

3 Claims, 1 Drawing Sheet

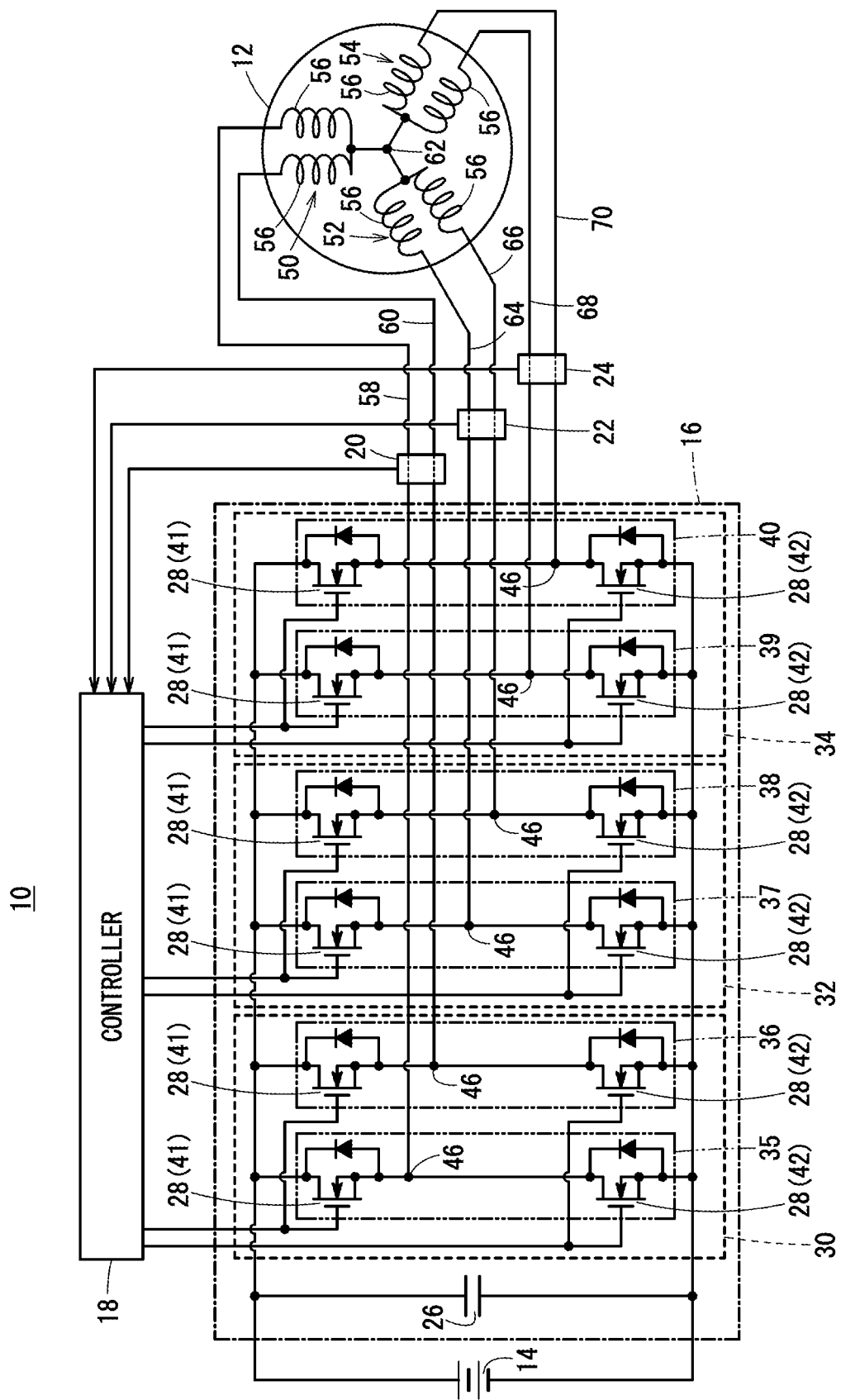

ELECTRIC MOTOR SYSTEM

CROSS-REFERENCE TO RELATED APPLICATIONS

This application is based upon and claims the benefit of priority from Japanese Patent Application No. 2022-049599 filed on Mar. 25, 2022, the contents of which are incorporated herein by reference.

BACKGROUND OF THE INVENTION

Field of the Invention

The present invention relates to an electric motor system.

Description of the Related Art

JP 2007-254095 A discloses an elevator apparatus. The elevator apparatus includes two inverters and one motor. The two inverters are connected in parallel to the motor. Specifically, the motor is a three-phase electric motor. Each of the two inverters is a three-phase inverter. For each of the two inverters, the output terminal of each phase is connected to the coil of the corresponding phase of the motor. In the two inverters, the output terminals of the same phase are connected to each other via a reactor. As a result, the loop current is attenuated and the unbalance of the current in the system is eliminated.

SUMMARY OF THE INVENTION

However, in JP 2007-254095 A, it is necessary to additionally provide a reactor between the two inverters and the motor in order to attenuate the loop current and eliminate the unbalance of the current in the system. This increases the size and weight of the overall system. Further, in a system in which a large current flows through the motor, it is necessary to increase the size of the reactor in accordance with the magnitude of the current. In this case also, the size and weight of the entire system are increased. Further, it is also necessary to consider cooling of the reactor. As a result, the entire system is wasteful and costly.

An object of the present invention is to solve the above-mentioned problems.

According to an aspect of the present invention, there is provided an electric motor system including: a direct-current power supply; a power conversion device including a plurality of switching elements and configured to convert a direct-current power output from the direct-current power supply into an alternating-current power by turning on and off the plurality of switching elements; and an electric motor configured to be driven by the alternating-current power, wherein each of the power conversion device and the electric motor includes a plurality of phases, in order to output the alternating-current power in parallel for each of the phases, the power conversion device includes, for each of the phases, two sets each of which includes, among the plurality of switching elements, a switching element of an upper arm and a switching element of a lower arm which are connected in series, the two sets being connected in parallel to the direct-current power supply, and the electric motor is a star-connected electric motor, and includes two coils for each of the phases, in order to receive the alternating-current power which the power conversion device outputs in parallel for each of the phases.

According to the present invention, by effectively utilizing the coils of the electric motor, the loop current can be attenuated and the unbalance of the current in the electric motor system can be eliminated, with the minimum necessary configuration. In addition, an increase in the size and weight of the entire electric motor system can be suppressed.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a circuit diagram of an electric motor system according to the present embodiment.

DETAILED DESCRIPTION OF THE INVENTION

FIG. 1 is a circuit diagram of an electric motor system 10 according to the present embodiment. The electric motor system 10 is a control circuit system for driving an electric motor 12.

The electric motor system 10 includes a direct-current (DC) power supply 14, a power conversion device 16, a controller 18, an electric motor 12, and three current sensors 20, 22, and 24.

The power conversion device 16 is electrically connected to the DC power supply 14.

The power conversion device 16 is a three-phase (U-phase, V-phase, and W-phase) inverter. The power conversion device 16 includes a capacitor 26 and a plurality of switching elements 28. The capacitor 26 is electrically connected in parallel to the DC power supply 14. Each of the plurality of switching elements 28 is, for example, an N-channel metal-oxide-semiconductor field-effect transistor (MOSFET). FIG. 1 also shows a body diode of the MOSFET.

The controller 18 is an electronic control unit (ECU) of the electric motor system 10. The controller 18 supplies a control signal to each of the plurality of switching elements 28 to turn on and off the plurality of switching elements 28. The control signal is a pulse signal. The controller 18 adjusts the duty ratio of the control signal to adjust the ON time and the OFF time of the plurality of switching elements 28 as desired.

The power conversion device 16 has three phase legs 30, 32, 34. The three phase legs 30, 32, 34 are legs of U-phase, V-phase and W-phase. In the following description, the legs may be referred to as the U-phase leg 30, the V-phase leg 32, and the W-phase leg 34. The U-phase leg 30, the V-phase leg 32, and the W-phase leg 34 are electrically connected in parallel to the DC power supply 14.

The U-phase leg 30 has two legs 35 and 36. The V-phase leg 32 has two legs 37 and 38. The W-phase leg 34 has two legs 39 and 40. For each of the U-phase leg 30, the V-phase leg 32, and the W-phase leg 34, one leg 35, 37, 39 of the two legs 35 and 36, 37 and 38, 39 and 40 will be also referred to as a first leg 35, 37, 39. Also, the other leg 36, 38, 40 may be referred to as a second leg 36, 38, 40.

In the U-phase leg 30, the first leg 35 and the second leg 36 are electrically connected in parallel to the DC power supply 14. In the V-phase leg 32, the first leg 37 and the second leg 38 are electrically connected in parallel to the DC power supply 14. In the W-phase leg 34, the first leg 39 and the second leg 40 are electrically connected in parallel to the DC power supply 14.

Each of the first legs 35, 37, 39 and the second legs 36, 38, 40 includes two switching elements 28. The two switching elements 28 are the switching element 28 of an upper arm 41 and the switching element 28 of a lower arm 42. In the following description, the switching element 28 of the upper arm 41 is simply referred to as the upper arm 41. The switching element 28 of the lower arm 42 is simply referred to as the lower arm 42.

In each of the first legs 35, 37, 39 and the second legs 36, 38, 40, the upper arm 41 and the lower arm 42 are electrically connected in series. One end of the upper arm 41 is electrically connected to the positive electrode of the DC power supply 14. The other end of the upper arm 41 is electrically connected to one end of the lower arm 42 via a connection point 46 (a power output point). The other end of the lower arm 42 is electrically connected to the negative electrode of the DC power supply 14.

As described above, each of the U-phase leg 30, the V-phase leg 32, and the W-phase leg 34 includes the four switching elements 28. That is, each of the U-phase leg 30, the V-phase leg 32, and the W-phase leg 34 has the two upper arms 41 and the two lower arms 42. The U-phase leg 30 includes the two legs 35 and 36 (the first leg 35 and a second leg 36) each including one set of the upper arm 41 and the lower arm 42. The V-phase leg 32 includes the two legs 37 and 38 (the first leg 37 and the second leg 38) each including one set of the upper arm 41 and the lower arm 42. The W-phase leg 34 includes the two legs 39 and 40 (the first leg 39 and the second leg 40) each including one set of the upper arm 41 and the lower arm 42.

The electric motor 12 is a three-phase alternating-current (AC) motor. The electric motor 12 is a star-connected electric motor 12. That is, the electric motor 12 has a U-phase 50, a V-phase 52, and a W-phase 54. The U-phase 50 of the electric motor 12 corresponds to the U-phase leg 30 of the power conversion device 16. The V-phase 52 of the electric motor 12 corresponds to the V-phase leg 32 of the power conversion device 16. The W-phase 54 of the electric motor 12 corresponds to the W-phase leg 34 of the power conversion device 16. Each of the U-phase 50, the V-phase 52, and the W-phase 54 of the electric motor 12 is provided with two coils 56.

One end of one coil 56 of the two coils 56 of the U-phase 50 is connected to the connection point 46 of the first leg 35 of the U-phase leg 30. More specifically, the one end of the one coil 56 and the connection point 46 of the first leg 35 are electrically connected to each other via a wire 58.

One end of the other coil 56 of the two coils 56 of the U-phase 50 is connected to the connection point 46 of the second leg 36 of the U-phase leg 30. More specifically, the one end of the other coil 56 and the connection point 46 of the second leg 36 are electrically connected via a wire 60.

The other ends of the two coils 56 of the U-phase 50 are electrically connected to a neutral point 62 of the electric motor 12.

Similarly, one end of one coil 56 of the two coils 56 of the V-phase 52 is connected to the connection point 46 of the first leg 37 of the V-phase leg 32. More specifically, the one end of the one coil 56 and the connection point 46 of the first leg 37 are electrically connected to each other via a wire 64.

One end of the other coil 56 of the two coils 56 of the V-phase 52 is connected to the connection point 46 of the second leg 38 of the V-phase leg 32. More specifically, the one end of the other coil 56 and the connection point 46 of the second leg 38 are electrically connected to each other via a wire 66.

The other ends of the two coils 56 of the V-phase 52 are electrically connected to the neutral point 62.

One end of one coil 56 of the two coils 56 of the W-phase 54 is connected to the connection point 46 of the first leg 39 of the W-phase leg 34. More specifically, the one end of the one coil 56 and the connection point 46 of the first leg 39 are electrically connected to each other via a wire 68.

One end of the other coil 56 of the two coils 56 of the W-phase 54 is connected to the connection point 46 of the second leg 40 of the W-phase leg 34. More specifically, the one end of the other coil 56 and the connection point 46 of the second leg 40 are electrically connected to each other via a wire 70.

The other ends of the two coils 56 of the W-phase 54 are electrically connected to the neutral point 62.

As described above, in the U-phase leg 30, the two legs 35 and 36 (the first leg 35 and the second leg 36) are electrically connected in parallel to the DC power supply 14. In the V-phase leg 32, the two legs 37 and 38 (the first leg 37 and the second leg 38) are electrically connected in parallel to the DC power supply 14. In the W-phase leg 34, the two legs 39 and 40 (the first leg 39 and the second leg 40) are electrically connected in parallel to the DC power supply 14.

In the U-phase 50 of the electric motor 12, the two coils 56 are electrically connected in parallel to the U-phase leg 30 via the two wires 58 and 60. In the V-phase 52, the two coils 56 are electrically connected in parallel to the V-phase leg 32 via the two wires 64 and 66. In the W-phase 54, the two coils 56 are electrically connected in parallel to the W-phase leg 34 via the two wires 68 and 70.

Each of the three current sensors 20, 22, 24 is a current sensor of Hall sensor type.

The current sensor 20 is disposed on the two wires 58 and 60 of the U-phase. The current sensor 20 collectively acquires the current values of the currents flowing through the two wires 58 and 60 of the U-phase. That is, the current sensor 20 detects the sum of the current values of the currents flowing through the two wires 58 and 60, as the current value of the current flowing through the two coils 56 of the U-phase 50 of the electric motor 12.

Similarly, the current sensor 22 is disposed on the two wires 64 and 66 of the V-phase. The current sensor 22 collectively acquires the current values of the currents flowing through the two wires 64 and 66 of the V-phase. That is, the current sensor 22 detects the sum of the current values of the currents flowing through the two wires 64 and 66, as the current value of the current flowing through the two coils 56 of the V-phase 52 of the electric motor 12.

The current sensor 24 is disposed on the two wires 68 and 70 of the W-phase. The current sensor 24 collectively acquires the current values of the currents flowing through the two wires 68 and 70 of the W-phase. That is, the current sensor 24 detects the sum of the current values of the currents flowing through the two wires 68 and 70, as the current value of the current flowing through the two coils 56 of the W-phase 54 of the electric motor 12.

The operation of the electric motor system 10 configured as described above will be described. The controller 18 supplies control signals to the plurality of switching elements 28. Each of the plurality of switching elements 28 is turned on and off in accordance with the supplied control signal. Thus, in the power conversion device 16, a DC power supplied from the DC power supply 14 is converted into a three-phase AC power.

As described above, in the U-phase leg 30, the two legs 35 and 36 (the first leg 35 and the second leg 36) are provided in parallel. In the V-phase leg 32, the two legs 37 and 38 (the first leg 37 and the second leg 38) are provided in parallel. In the W-phase leg 34, the two legs 39 and 40 (the first leg 39 and the second leg 40) are provided in parallel. The U-phase leg 30 and the two coils 56 of the U-phase 50 are electrically connected to each other via the two wires 58 and 60. The V-phase leg 32 and the two coils 56 of the V-phase 52 are electrically connected to each other via the two wires 64 and 66. The W-phase leg 34 and the two coils 56 of the W-phase 54 are electrically connected to each other via the two wires 68 and 70.

Therefore, when the two upper arms 41 of the U-phase leg 30 and the two lower arms 42 of the V-phase leg 32 or the W-phase leg 34 are turned on, AC power is output in parallel from the two connection points 46 of the U-phase leg 30 to the two coils 56 of the U-phase 50.

When the two upper arms 41 of the V-phase leg 32 and the two lower arms 42 of the U-phase leg 30 or the W-phase leg 34 are turned on, AC power is output in parallel from the two connection points 46 of the V-phase leg 32 to the two coils 56 of the V-phase 52.

Furthermore, when the two upper arms 41 of the W-phase leg 34 and the two lower arms 42 of the U-phase leg 30 or the V-phase leg 32 are turned on, AC power is output in parallel from the two connection points 46 of the W-phase leg 34 to the two coils 56 of the W-phase 54.

The electric motor 12 is driven by the supplied AC power.

The current sensor 20 collectively detects the sum of the current values of the currents flowing through the two wires 58 and 60 of the U-phase, as the current value of the current flowing through the U-phase 50 of the electric motor 12. The current sensor 22 collectively detects the sum of the current values of the currents flowing through the two wires 64 and 66 of the V-phase, as the current value of the current flowing through the V-phase 52. The current sensor 24 collectively detects the sum of the current values of the currents flowing through the two wires 68 and 70 of the W-phase, as the current value of the current flowing through the W-phase 54. Each of the three current sensors 20, 22, 24 outputs a detection result of a current value to the controller 18. The controller 18 controls the plurality of switching elements 28 by adjusting the duty ratio of each control signal based on each detection result that has been input.

When the electric motor 12 functions as a generator, the electric motor 12 supplies a generated three-phase AC power to the power conversion device 16. The power conversion device 16 converts the three-phase AC power into DC power by turning on and off the plurality of switching elements 28. The converted DC power is supplied to the DC power supply 14 for charging the DC power supply.

In the above description, the case where each of the plurality of switching elements 28 is an N-channel MOSFET is described. In the present embodiment, various switching elements other than the N-channel MOSFET may be used as the plurality of switching elements 28. For example, each of the plurality of switching elements 28 may be an insulated gate bipolar transistor (IGBT). When each of the plurality of switching elements 28 is such an IGBT, it is necessary to connect a diode in parallel to the IGBT.

The invention that can be grasped from the above embodiment will be described below.

According to an aspect of the present invention, the electric motor system (10) includes: the direct-current power supply (14); the power conversion device (16) including the plurality of switching elements (28) and configured to convert the direct-current power output from the direct-current power supply into the alternating-current power by turning on and off the plurality of switching elements; and the electric motor (12) configured to be driven by the alternating-current power, wherein each of the power conversion device and the electric motor includes the plurality of phases, in order to output the alternating-current power in parallel for each of the phases, the power conversion device includes, for each of the phases, two sets each of which includes, among the plurality of switching elements, the switching element of the upper arm (41) and the switching element of the lower arm (42) which are connected in series, the two sets being connected in parallel to the direct-current power supply, and the electric motor is a star-connected electric motor, and includes the two coils (56) for each of the phases, in order to receive the alternating-current power which the power conversion device outputs in parallel for each of the phases.

According to the present invention, by effectively utilizing the coils of the electric motor, the loop current can be attenuated and the unbalance of the current in the electric motor system can be eliminated, with the minimum necessary configuration. In addition, an increase in the size and weight of the entire electric motor system can be suppressed.

In the aspect of the present invention, the connection point (46) between the switching element of the upper arm and the switching element of the lower arm in each of the sets may be used as the power output point, one end of one coil of the two coils for each of the phases may be connected to the power output point of one set of the two sets connected in parallel, and one end of the other coil of the two coils may be connected to the power output point of the other set of the two sets, and the other end of each of the two coils for each of the phases may be connected to the neutral point (62).

Thus, it is possible to efficiently eliminate the unbalance of the current in the electric motor system, with the minimum necessary configuration.

In the aspect of the present invention, the electric motor system may include: the Hall sensor type current sensor (20, 22, 24) provided for each of the phases and configured to collectively acquire the current value of the current flowing from the power output point of the one set to the one end of the one coil and the current value of the current flowing from the power output point of the other set to the one end of the other coil; and the controller (18) configured to control the electric motor by controlling the plurality of switching elements based on the current values collectively acquired by the current sensor provided for each of the phases.

The above configuration eliminates the need to provide a current sensor for each wire. In addition, the electric motor can be controlled, with the minimum necessary configuration.

Note that the present invention is not limited to the above-described disclosure, and various configurations can be adopted without departing from the essence and gist of the present invention.

The invention claimed is:
1. An electric motor system comprising:
a direct-current power supply;
a power conversion device including a plurality of switching elements and configured to convert a direct-current power output from the direct-current power supply into an alternating-current power by turning on and off the plurality of switching elements; and an electric motor configured to be driven by the alternating-current power, wherein each of the power conversion device and the electric motor includes a plurality of phases, in order to output the alternating-current power in parallel for each of the phases, the power conversion device includes, for each of the phases, a first set and a second set, the first set and the second set for each of the phases are connected in parallel to the direct-current power supply, in each of the first set and the second set for each of the phases, among the plurality of switching elements, a switching element of an upper arm and a switching element of a lower arm are connected in series, the electric motor is a star-connected electric motor, and includes two coils for each of the phases, in order to receive the alternating-current power which the power conversion device outputs in parallel for each of the phases, a connection point between the switching element of the upper arm and the switching element of the lower arm is used as a power output point of each of the first set and the second set for each of the phases, one end of one coil of the two coils for each of the phases is connected to the power output point of the first set, and one end of another coil of the two coils for each of the phases is connected to the power output point of the second set, and another end of each of the two coils for each of the phases is directly connected to a neutral point.

2. The electric motor system according to claim 1, further comprising:

a current sensor of Hall sensor type, provided for each of the phases and configured to collectively acquire a current value of a current flowing from the power output point of the first set to the one end of the one coil and a current value of a current flowing from the power output point of the second set to the one end of the other coil; and a controller configured to control the electric motor by controlling the plurality of switching elements based on the current values collectively acquired by the current sensor provided for each of the phases.

3. The electric motor system according to claim 1, wherein the first set and the second set for each of the phases are housed in a same power conversion device, and in the power conversion device, on a circuit diagram, the first set and the second set for each of the phases are alternately arranged.

* * * * *